(12) United States Patent
Kobayashi et al.

(10) Patent No.: US 11,212,634 B2
(45) Date of Patent: Dec. 28, 2021

(54) SOUND SIGNAL PROCESSING DEVICE, SOUND ADJUSTMENT METHOD, AND MEDIUM

(71) Applicant: Socionext Inc., Kanagawa (JP)

(72) Inventors: Katsumi Kobayashi, Yokohama (JP); Kazutaka Abe, Yokohama (JP); Yoshitaka Mizuno, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/997,745

(22) Filed: Aug. 19, 2020

(65) Prior Publication Data

US 2020/0382893 A1 Dec. 3, 2020

Related U.S. Application Data

(63) Continuation of application No. PCT/JP2018/006155, filed on Feb. 21, 2018.

(51) Int. Cl.
| | |
|---|---|
| *H04S 7/00* | (2006.01) |
| *G06F 3/16* | (2006.01) |
| *H04R 3/12* | (2006.01) |
| *H04R 5/04* | (2006.01) |

(52) U.S. Cl.
CPC .............. *H04S 7/302* (2013.01); *G06F 3/165* (2013.01); *H04R 3/12* (2013.01); *H04R 5/04* (2013.01); *H04R 2430/20* (2013.01)

(58) Field of Classification Search
None
See application file for complete search history.

(56) References Cited

U.S. PATENT DOCUMENTS

| | | | | |
|---|---|---|---|---|
| 6,026,169 A | * | 2/2000 | Fujimori | H04S 1/005 381/17 |
| 7,174,229 B1 | * | 2/2007 | Chen | H04S 3/008 700/94 |
| 10,999,427 B2 | * | 5/2021 | Lyren | G06F 3/04817 |
| 2009/0034745 A1 | * | 2/2009 | Mizuno | H04S 7/30 381/1 |
| 2016/0295342 A1 | | 10/2016 | Miyasaka et al. | |

FOREIGN PATENT DOCUMENTS

| | | |
|---|---|---|
| JP | 2002-166788 A | 6/2002 |
| JP | 2010-192995 A | 9/2010 |
| JP | 2013-201564 A | 10/2013 |
| WO | 2009/072308 A1 | 6/2009 |
| WO | 2015/087490 A1 | 6/2015 |

OTHER PUBLICATIONS

International Search Report and Written Opinion issued in corresponding International Application No. PCT/JP2018/006155, dated May 22, 2018, with partial translation.

\* cited by examiner

*Primary Examiner* — Paul W Huber

(74) *Attorney, Agent, or Firm* — McDermott Will & Emery LLP

(57) ABSTRACT

An audio signal processing device includes a memory; and a processor configured to execute receiving a command to determine one set of parameters from among parameters calculated according to positions at which a sound is localized, the positions being set relative to positions of audio output devices; and processing a sound to be output from the audio output devices, by using the one set of parameters determined based on the received command.

7 Claims, 14 Drawing Sheets

FIG.7

| NUMBER | PARAMETER INFORMATION | | |
|---|---|---|---|
| | COORDINATES OF RIGHT LOCALIZATION POSITION | COORDINATES OF LEFT LOCALIZATION POSITION | PARAMETERS |
| 1 | $(X_{R1}, Y_{R1}, Z_{R1})$ | $(X_{L1}, Y_{L1}, Z_{L1})$ | $A_1, B_1, C_1, D_1$ |
| 2 | | $(X_{L2}, Y_{L1}, Z_{L1})$ | $A_2, B_2, C_2, D_2$ |
| ... | | ... | ... |
| n×n×n | | $(X_{Ln}, Y_{Ln}, Z_{Ln})$ | $A_K, B_K, C_K, D_K$ |
| n×n×n+1 | $(X_{R2}, Y_{R2}, Z_{R1})$ | $(X_{L1}, Y_{L1}, Z_{L1})$ | $A_{K+1}, B_{K+1}, C_{K+1}, D_{K+1}$ |
| n×n×n+2 | | $(X_{L2}, Y_{L1}, Z_{L1})$ | $A_{K+2}, B_{K+2}, C_{K+2}, D_{K+2}$ |
| ... | | ... | ... |
| 2×n×n×n | | $(X_{Ln}, Y_{Ln}, Z_{Ln})$ | $A_{2K}, B_{2K}, C_{2K}, D_{2K}$ |

Select positions at which you hear the sound around your ears.

Make a sound

| | | | | | | |
|---|---|---|---|---|---|---|
| Vertical direction | Low | 1 | 2 | 3 | 4 | 5 | High |
| Horizontal direction | Left | 1 | 2 | 3 | 4 | 5 | Right |
| Front-back direction | Front | 1 | 2 | 3 | 4 | 5 | Back |
| Width | Narrow | 1 | 2 | 3 | 4 | 5 | Wide |

Determined    Cancel

FIG.13B

Select positions at which you hear the sound around your ears.

Make a sound

Right   Left   Both

| | | | | | | |
|---|---|---|---|---|---|---|
| Vertical direction | Low | 1 | 2 | 3 | 4 | 5 | High |
| Horizontal direction | Left | 1 | 2 | 3 | 4 | 5 | Right |
| Front-back direction | Front | 1 | 2 | 3 | 4 | 5 | Back |

Determined    Cancel

SOUND SIGNAL PROCESSING DEVICE, SOUND ADJUSTMENT METHOD, AND MEDIUM

CROSS-REFERENCE TO RELATED APPLICATIONS

This U.S. non-provisional application is a continuation application of, and claims the benefit of priority under 35 U.S.C. § 365(c) from, PCT International Application PCT/JP2018/006155 filed on Feb. 21, 2018, which is designated the U.S., the entire contents of which are incorporated herein by reference.

TECHNICAL FIELD

The present disclosure relates to an audio signal processing device, an audio adjustment method, and a medium.

BACKGROUND ART

Audio signal processing devices have been known that are capable of localizing a sound output from audio output devices, such as speakers, around a particular part of the listener (e.g., close to the ears). Such an audio signal processing device processes a sound based on parameters calculated according to the transfer characteristics of the sound between the audio output devices and the listener, and transmits the sound to the audio output devices. This enables, for example, the listener to feel as if the sound is being output close to the ears, even when the audio output devices are installed in front of the listener (see, e.g., WO 2015/087490).

Here, the transfer characteristics of a sound between the audio output devices and the listener change depending on the relative positional relationship between the devices and the listener. Meanwhile, if a listener having a different build listens to the sound processed by the audio signal processing device, or if the listener changes his/her posture, the relative positional relationship between the audio output devices and the listener changes, and thereby, it is difficult to obtain the effect as described above. Therefore, until now, it has been necessary for the listener to alter his/her posture to conform to the positions where the sound is localized.

SUMMARY

According to one aspect, an audio signal processing device includes a memory; and a processor configured to execute receiving a command to determine one set of parameters from among parameters calculated according to positions at which a sound is localized, the positions being set relative to positions of audio output devices; and processing a sound to be output from the audio output devices, by using the one set of parameters determined based on the received command.

The object and advantages of the embodiment will be realized and attained by means of the elements and combinations particularly pointed out in the claims. It is to be understood that both the foregoing general description and the following detailed description are exemplary and explanatory and are not restrictive of the inventive concept as claimed.

BRIEF DESCRIPTION OF DRAWINGS

FIG. 7 is a table illustrating an example of parameter information;

FIGS. 13A and 13B are second diagrams illustrating examples of display screens displayed by the operation receiving unit.

EMBODIMENTS OF THE INVENTIVE CONCEPT

Figure 1:
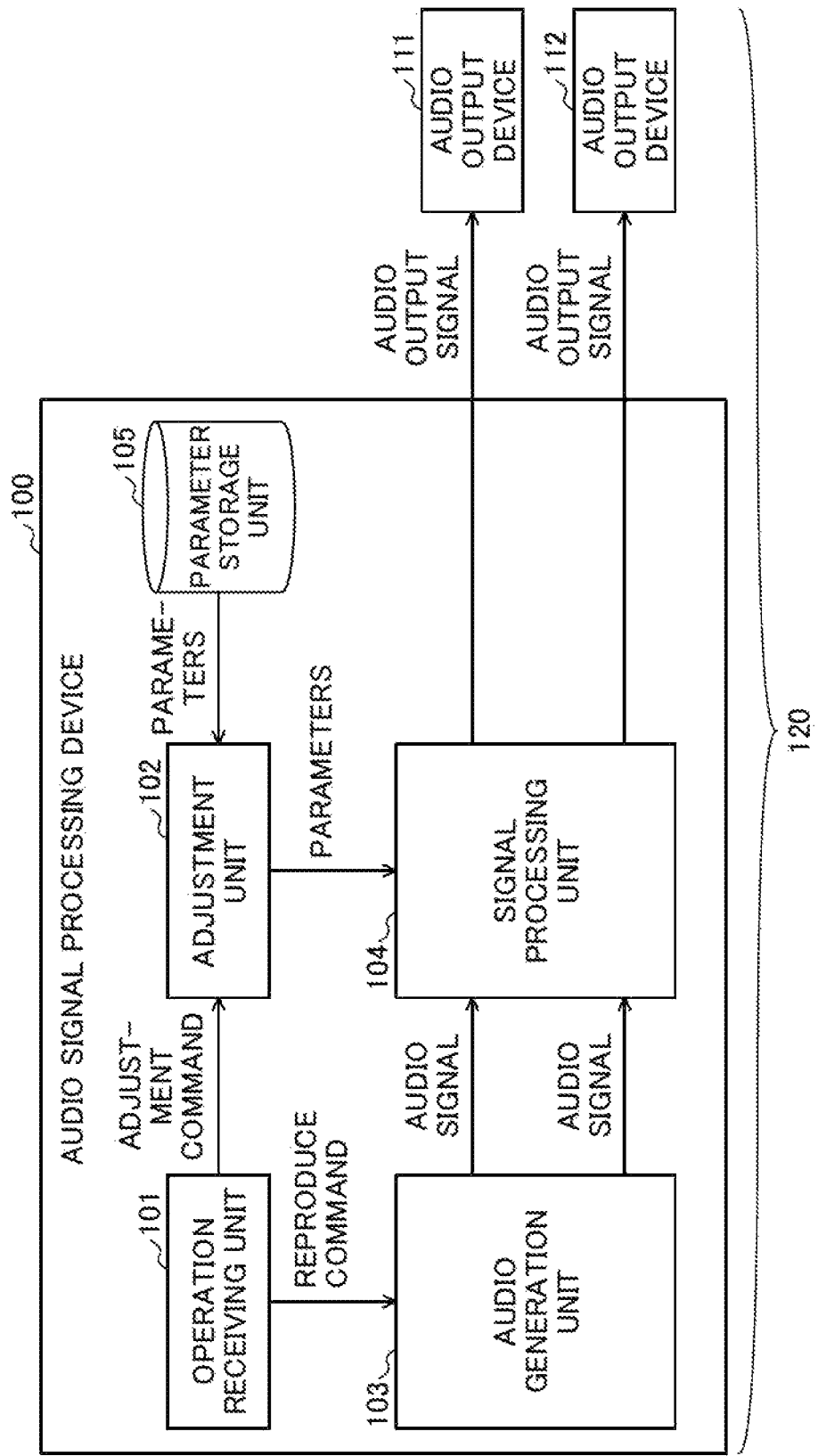
FIG. 1 is a diagram illustrating an example of a system configuration of an audio output system according to a first embodiment.

In the following, embodiments will be described with reference to the accompanying drawings. Note that in the specification and the drawings, the same reference numerals are assigned to components having substantially the same functions and configurations, to omit duplicated description.

According to an embodiment, it is possible to make the localization positions of a sound output from audio output devices adjustable by the listener.

First Embodiment

<System Configuration of Audio Output System>
First, a system configuration of an audio output system will be described. FIG. 1 is a diagram illustrating an example of a system configuration of an audio output system according to a first embodiment.

As illustrated in FIG. 1, an audio output system 120 includes an audio signal processing device 100 and audio output devices 111 and 112. The audio signal processing device 100 is connected to the audio output devices 111 and 112, to be capable of transmitting and receiving signals.

In the audio signal processing device 100, an operation receiving program, an adjustment program, an audio generation program, a signal processing program, and the like are installed. By executing these programs, the audio signal processing device 100 functions as an operation receiving unit 101, an adjustment unit 102, an audio generation unit 103, and a signal processing unit 104.

The operation receiving unit 101 receives an adjustment command related to parameters used in the signal processing unit 104, and notifies the adjustment unit 102 of the command. Also, the operation receiving unit 101 receives a reproduce command of a sound, and notifies the audio generation unit 103 of the command.

In the case of receiving an adjustment command from the operation receiving unit 101, the adjustment unit 102 reads parameters according to the notified adjustment command from the operation receiving unit 101 from among parameters stored in the parameter storage unit 105, and notifies the signal processing unit 104 of the read parameters.

In the case of receiving a reproduce command from the operation receiving unit 101, the audio generation unit 103 generates a predetermined audio signal and feeds the signal into the signal processing unit 104.

The signal processing unit 104 applies signal processing to the audio signal fed by the audio generation unit 103 by using the parameters notified by the adjustment unit 102, and transmits audio output signals to the audio output devices 111 and 112.

The audio output devices 111 and 112 output the audio output signals transmitted from the audio signal processing device 100.

Example of Installation of Audio Output System

Next, an example of installation of the audio output system 120 will be described. In the present embodiment, the audio output system 120 is assumed to be installed on a vehicle. Also, in the present embodiment, functions of the audio signal processing device 100 of the audio output system 120 are assumed to be implemented on a navigation device.

Figure 2:
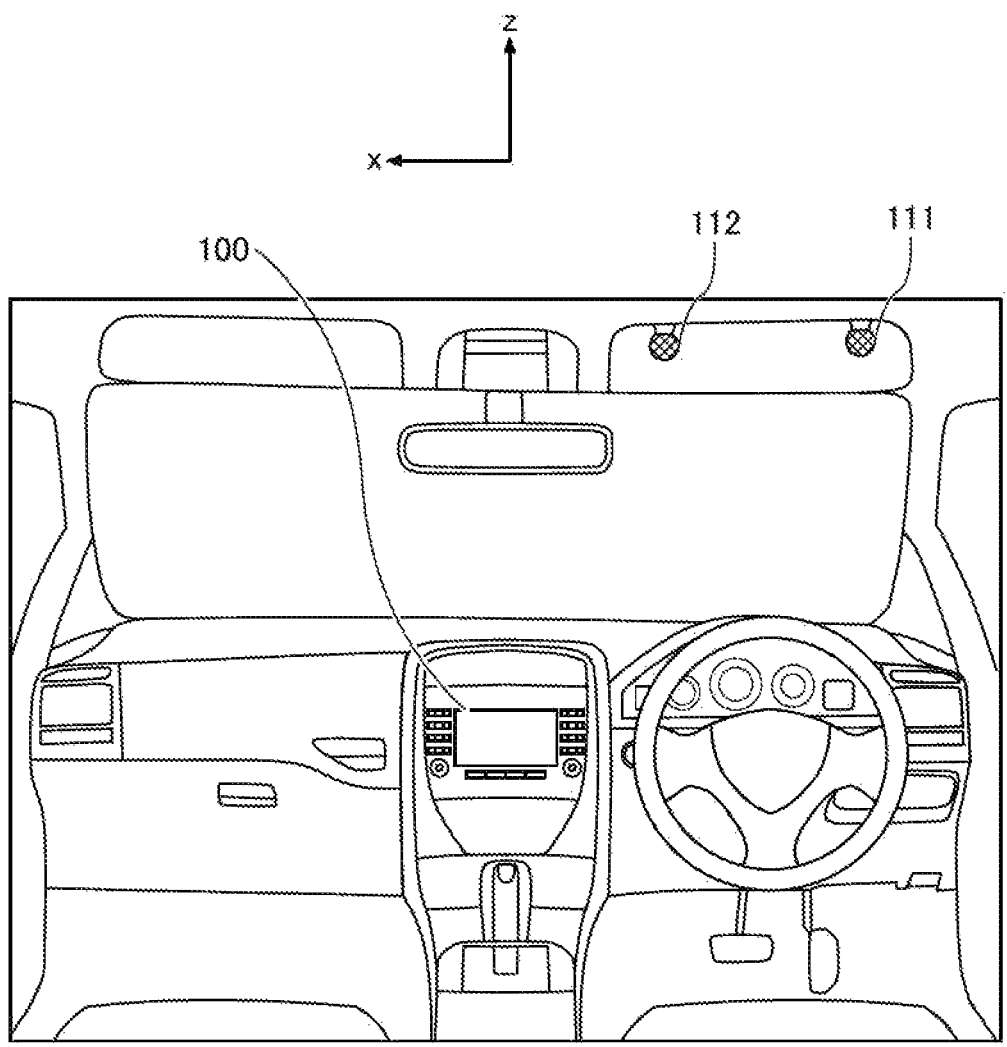
FIG. 2 is a diagram illustrating an example of installation of the audio output system.

FIG. 2 is a diagram illustrating an example of installation of the audio output system. As illustrated in FIG. 2, the navigation device, in which the functions of the audio signal processing device 100 are implemented, is installed, for example, in a center console in the interior of a vehicle. Also, a right speaker and a left speaker, which correspond to the audio output devices 111 and 112, respectively, are installed on a ceiling part (a part close to the windshield) in the interior of the vehicle. This enables the driver of the vehicle as the listener to feel as if a sound is being output close to the ears while listening to the sound to which signal processing is applied.

<Hardware Configuration of Audio Signal Processing Device>

Figure 3:
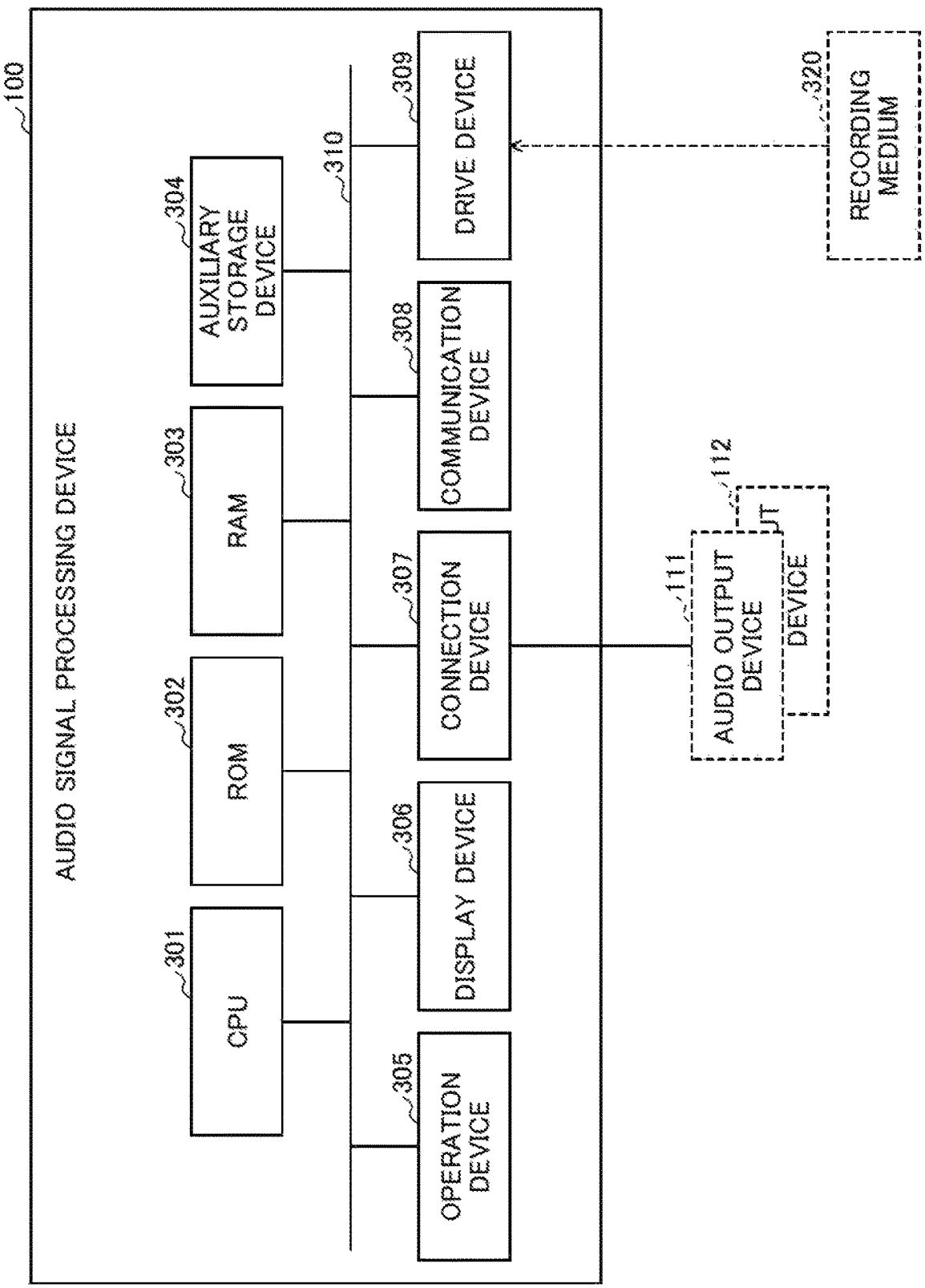
FIG. 3 is a diagram illustrating an example of a hardware configuration of the audio signal processing device.

Next, a hardware configuration of the audio signal processing device 100 will be described. FIG. 3 is a diagram illustrating an example of a hardware configuration of the audio signal processing device 100.

As illustrated in FIG. 3, the audio signal processing device 100 includes a CPU (Central Processing Unit) 301, a ROM (Read-Only Memory) 302, and a RAM (Random Access Memory) 303. The CPU 301, ROM 302, and RAM 303 constitute a so-called computer.

Also, the audio signal processing device 100 also includes an auxiliary storage device 304, an operation device 305, a display device 306, a connection device 307, a communication device 308, and a drive device 309. Note that the hardware components of the audio signal processing device 100 are connected with each other via a bus 310.

The CPU 301 is an arithmetic/logic device that executes various programs stored in the auxiliary storage device 304 (e.g., an operation receiving program, an adjustment program, an audio generation program, a signal processing program, and the like).

The ROM 302 is a non-volatile memory. The ROM 302 functions as a main memory device for storing various programs and data required for the CPU 301 to execute various programs stored in the auxiliary storage device 304. Specifically, the ROM 302 stores a boot program or the like such as BIOS (Basic Input/Output System) or EFI (Extensible Firmware Interface).

The RAM 303 is a volatile memory such as DRAM (Dynamic Random Access Memory) or SRAM (Static Random Access Memory). The RAM 303 functions as a main memory device that provides a working area in which various programs stored in the auxiliary storage device 304 are loaded when executed by the CPU 301.

The auxiliary storage device 304 is provided to store various programs and parameters used when executing the various programs. The parameter storage unit 105 described above is implemented using the auxiliary storage device 304.

The operation device 305 receives various commands input by the listener. The operation device 305 may be constituted with various button switches, predetermined operation devices, or a touch panel formed to be integrated with the display device 306. The display device 306 displays a display screen generated, for example, in the operation receiving unit 101.

The connection device 307 is connected to the audio output devices 111 and 112, to transmit audio output signals generated when the various programs are executed by the CPU 301, to the audio output devices 111 and 112. Note that the connection to the audio output devices 111 and 112 may be wired or wireless using short-range radio communication such as Bluetooth (registered trademark). The communication device 308 is provided to communicate through a network.

The drive device 309 is a device for setting a recording medium 320. The recording medium 320 here may be a medium for optically, electrically, or magnetically recording information, such as a CD-ROM, a flexible disk, a magneto-optical disk, or the like. Also, the recording medium 320 may be a semiconductor memory or the like for electrically recording information, such as a ROM, a flash memory, or the like.

Note that the various programs to be stored in the auxiliary storage device 304 are stored, for example, by setting a distributed recording medium 320 in the drive device 309 and reading the various programs recorded on the recording medium 320 by the drive device 309.

<Details of Units of the Audio Signal Processing Device>

Next, among the units of the audio signal processing device 100 (the operation receiving unit 101, the adjustment unit 102, the audio generation unit 103, the signal processing unit 104, and the parameter storage unit 105), the units except for the audio generation unit 103 will be described in detail.

(1) Details of the Signal Processing Unit

Figure 4:
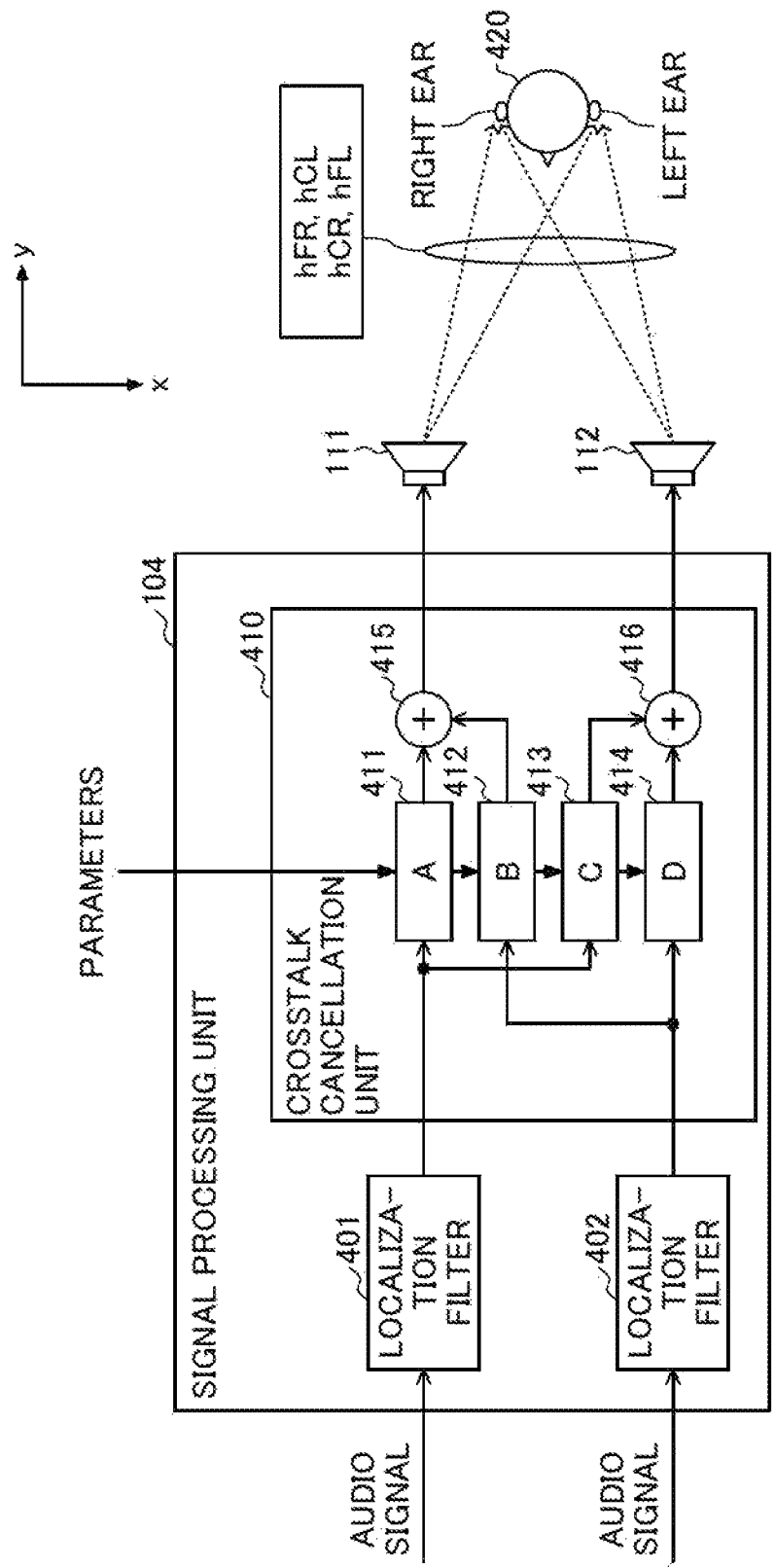
FIG. 4 is a diagram illustrating an example of a functional configuration of a signal processing unit of the audio signal processing device.

First, details of the signal processing unit 104 of the audio signal processing device 100 will be described. FIG. 4 is a diagram illustrating an example of a functional configuration of the signal processing unit 104 of the audio signal processing device 100.

As illustrated in FIG. 4, the signal processing unit 104 of the audio signal processing device 100 includes localization filters 401 and 402, and a crosstalk canceling unit 410.

The localization filter 401 is a filter designed so that a listener 420 (in the present embodiment, the driver of the vehicle) can hear the sound of an audio signal coming in the right direction. An audio signal to which filtering is applied in the localization filter 401 is input into the crosstalk canceling unit 410.

The localization filter 402 is a filter designed so that the listener 420 can hear the sound of an audio signal coming in the left direction. An audio signal to which filtering is applied in the localization filter 402 is input into the crosstalk canceling unit 410.

The crosstalk canceling unit 410 multiplies the filtered audio signals input from the localization filters 401 and 402 by parameters A to D set in the adjustment unit 102. Note that the parameters A to D are calculated based on the following formula.

$$\begin{bmatrix} A & B \\ C & D \end{bmatrix} = \begin{bmatrix} hFR, & hCL \\ hCR, & hFL \end{bmatrix}^{-1} \quad \text{(Formula 1)}$$

In the above formula, "hFR" is a measured value indicating a transfer characteristic of a sound from the audio output device 111 to the right ear of the listener 420; and "hFL" is a measured value indicating a transfer characteristic of a sound from the audio output device 112 to the left ear of the listener 420. Also, "hCR" is a measured value indicating a transfer characteristic of a sound from the audio output device 111 to the left ear of the listener 420; and "hCL" is a measured value indicating a transfer characteristic of a sound from the audio output device 112 to the right ear of the listener 420. In other words, the parameters A to D vary with the transfer characteristics that depend on the relative positional relationship between the audio output devices 111 and 112, and the left and right ears (left localization position, right localization position) of the listener 420.

A multiplier 411 multiplies the filtered audio signal input from the localization filter 401 by the parameter A. A multiplier 412 multiplies the filtered audio signal input from the localization filter 402 by the parameter B.

A multiplier 413 multiplies the filtered audio signal input from the localization filter 401 by the parameter C. A multiplier 414 multiplies the filtered audio signal input from the localization filter 402 by the parameter D.

An adder 415 adds up the audio signals multiplied by the parameters A and B in the multiplier 411 and the multiplier 412, respectively, and transmits the added result as an audio output signal to the audio output device 111. An adder 416 adds up the audio signals multiplied by the parameters C and D in the multiplier 413 and the multiplier 414, respectively, and transmits the added result as an audio output signal to the audio output device 112.

These operations enable the audio signal processing device 100 to localize the sound of an audio signal generated in the audio generation unit 103, at positions close to the right ear and close the left ear of the listener 420.

Note that as illustrated in FIG. 4, in the present embodiment, in a state where the listener 420 is seated in the driver's seat facing toward the audio output devices 111 and 112, a direction from the front to the rear of the listener 420 (i.e., a direction from the front to the rear of the vehicle) is defined as the y-axis direction. Also, a direction from the right ear to the left ear of the listener 420 (i.e., from the right to the left in the width direction of the vehicle) is defined as the x-axis direction.

(2) Details of the Parameter Storage Unit

Next, details of parameter information stored in the parameter storage unit 105 of the audio signal processing device 100 will be described.

(i) Description of Localization Positions

First, localization positions will be described, which are defined as variable relative positions with respect to the audio output devices 111 and 112. As described above, the parameters A to D depend on the relative positional relationship between the audio output devices 111 and 112 and the left and right ears (left localization position, right localization position) of the listener 420. Therefore, in the parameter storage unit 105, the parameters A to D are stored in association with the relative positional relationship between the audio output devices 111 and 112 and the ears (localization positions) of the listener 420.

Figure 5A:
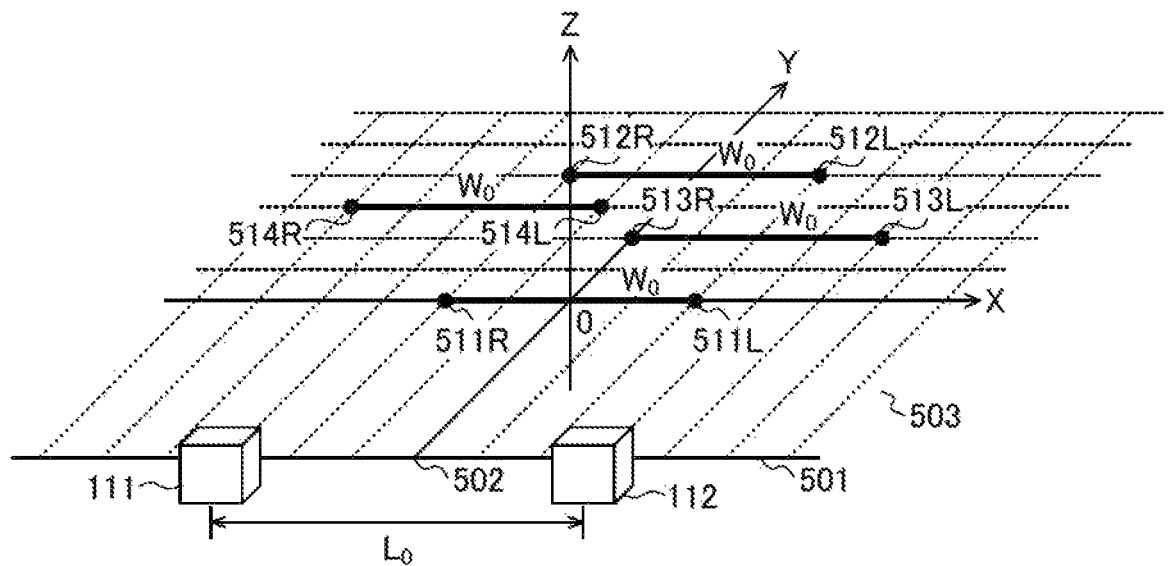
FIGS. 5A and 5B are first diagrams illustrating examples of right localization positions and left localization positions.
Figure 5B:
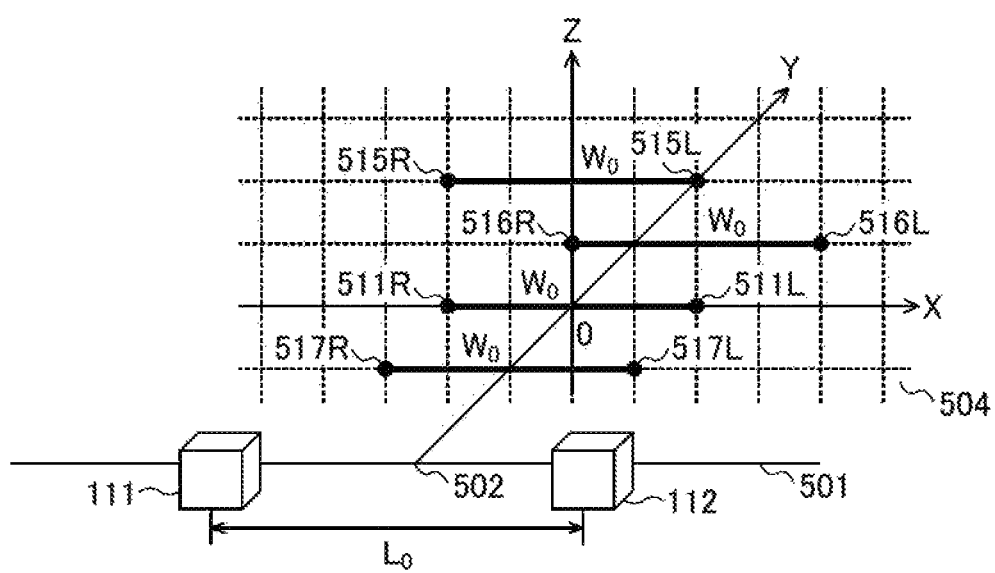

FIGS. 5A and 5B are first diagrams illustrating examples of right localization positions and left localization positions. As illustrated in FIGS. 5A and 5B, in the present embodiment, the distance between the audio output device 111 and the audio output device 112 is denoted as $L_0$. Also, in the present embodiment, the Y-axis is defined as a straight line passing through the middle point 502 of a line 501 connecting the audio output devices 111 and 112, and parallel to the output direction in which the audio output devices 111 and 112 output audio output signals (a straight line designating the depth direction with respect to the audio output devices 111 and 112).

Also, in the present embodiment, the X-axis is defined as a straight line having the origin at a point on the Y-axis at a predetermined distance from the middle point 502, and parallel to the line 501 (a straight line designating the horizontal direction with respect to the audio output devices 111 and 112). Further, in the present embodiment, the Z-axis is defined as a straight line passing through the origin and orthogonal to the X-axis and the Y-axis (a straight line designating the vertical direction with respect to the audio output devices 111 and 112). Note that in a state where the audio output system 120 is installed on the vehicle, the X-axis and the Y-axis in FIG. 5 may correspond to the x-axis and the y-axis in FIG. 4, respectively.

FIG. 5A illustrates various examples of right localization positions and left localization positions on a plane 503 formed with the X-axis and the Y-axis. Note that all the examples illustrated in FIG. 5A present cases where the same width $W_0$ is maintained between the respective right localization positions and left localization positions.

For example, a right localization position 512R and a left localization position 512L designate positions in the case of moving the right localization position 511R and the left localization position 511L in the depth direction while maintaining the width $W_0$.

Also, a right localization position 513R and a left localization position 513L designate positions in the case of moving the right localization position 511R and the left localization position 511L in the depth direction and in the left direction while maintaining the width $W_0$.

Further, a right localization position 514R and a left localization position 514L designate positions in the case of moving the right localization position 511R and the left localization position 511L in the depth direction and in the right direction while maintaining the width $W_0$.

FIG. 5B illustrates various examples of right localization positions and left localization positions on a plane 504 formed with the X-axis and the Z-axis. Note that all the examples illustrated in FIG. 5B present cases where the same width $W_0$ is maintained between the respective right localization positions and left localization positions.

For example, a right localization position 515R and a left localization position 515L designate positions in the case of moving the right localization position 511R and the left localization position 511L in the upward direction while maintaining the width $W_0$.

Also, a right localization position 516R and a left localization position 516L designate positions in the case of moving the right localization position 511R and the left localization position 511L in the upward direction and in the left direction while maintaining the width $W_0$.

Further, a right localization position 517R and a left localization position 517L designate positions in the case of moving the right localization position 511R and the left localization position 511L in the downward direction and in the right direction while maintaining the width $W_0$.

Figure 6A:
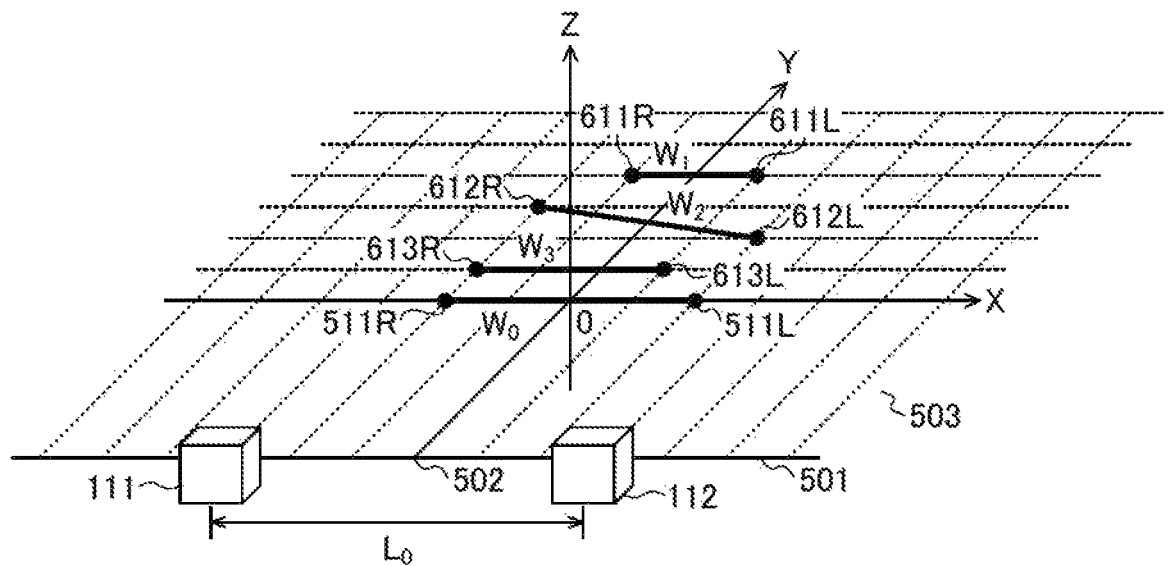
FIGS. 6A and 6B are second diagrams illustrating examples of right localization positions and left localization positions.
Figure 6B:
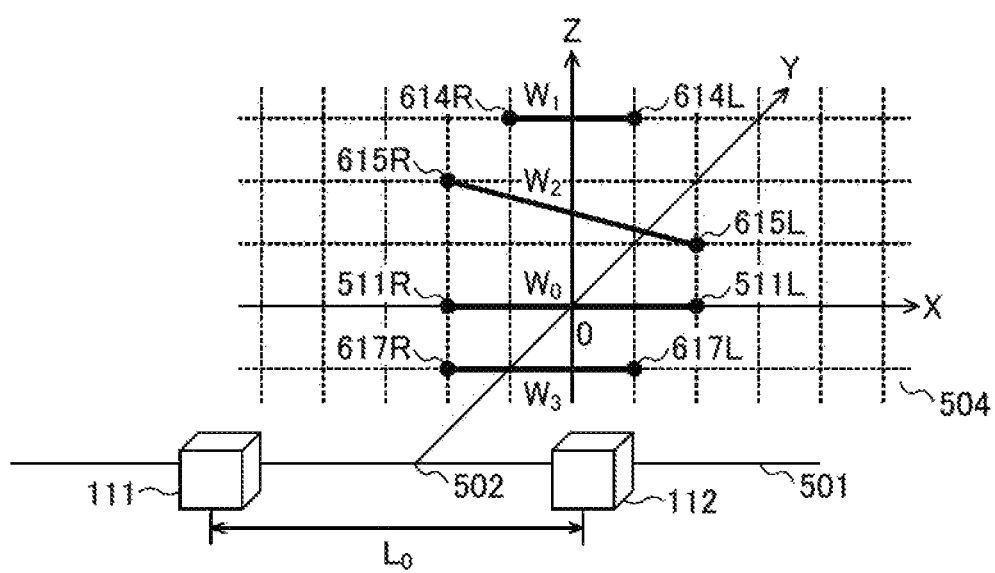

FIGS. 6A and 6B are second diagrams illustrating examples of right localization positions and left localization positions. Among these, FIG. 6A illustrates various examples of right localization positions and left localization positions on the plane 503 formed with the X-axis and the Y-axis. Note that the examples illustrated in FIG. 6A present cases where the widths between the respective right localization positions and left localization positions are different from each other.

For example, a right localization position 611R and a left localization position 611L designate positions in the case of moving the right localization position 511R and the left localization position 511L in the depth direction and changing the width $W_0$ to a width $W_1$.

Also, a right localization position 612R and a left localization position 612L designate positions in the case of moving the right localization position 511R and the left localization position 511L in the depth direction by different distances. Note that the right localization position 612R designates the position after the movement in the case of being moved by a longer distance than the left localization position 612L. Therefore, a width $W_2$ between the right localization position 612R and the left localization position 612L is longer than the width $W_0$ between the right localization position 511R and the left localization position 511L.

Further, a right localization position 613R and a left localization position 613L designate positions in the case of moving the right localization position 511R and the left localization position 511L in the depth direction and further moving only the left localization position in the right direction. Note that a width $W_3$ between the right localization position 613R and the left localization position 613L is shorter than the width $W_0$ between the right localization position 511R and the left localization position 511L.

FIG. 6B illustrates various examples of right localization positions and left localization positions on the plane 504 formed with the X-axis and the Z-axis. Note that the examples illustrated in FIG. 6B present cases where the widths between the respective right localization positions and left localization positions are different from each other.

For example, a right localization position 614R and a left localization position 614L designate positions in the case of moving the right localization position 511R and the left localization position 511L in the upward direction and changing the width $W_0$ to the width $W_1$.

Also, a right localization position 615R and a left localization position 615L designate positions in the case of moving the right localization position 511R and the left localization position 511L in the upward direction by different distances. Note that the right localization position 615R designates the position after the movement in the case of being moved by a longer distance than the left localization position 615L. Therefore, the width $W_2$ between the right localization position 615R and the left localization position 615L is longer than the width $W_0$ between the right localization position 511R and the left localization position 511L.

Further, a right localization position 617R and a left localization position 617L designate positions in the case of moving the right localization position 511R and the left localization position 511L in the downward direction and further moving only the left localization position in the right direction. Note that the width $W_3$ between the right localization position 617R and the left localization position 617L is shorter than the width $W_0$ between the right localization position 511R and the left localization position 511L.

(ii) Description of Parameter Information

Next, parameter information in which the parameters A to D are stored in association with the respective localization positions will be described. FIG. 7 is a table illustrating an example of parameter information. As tabulated in FIG. 7, the parameter information 700 includes, as the information items, "number", "coordinates of right localization position", "coordinates of left localization position", and "parameters".

The "number" stores a number that identifies a combination of a right localization position and a left localization position. The "coordinates of right localization position" stores the coordinates of the right localization position in one of the combinations of the right localization positions and the left localization positions as illustrated in FIGS. 5 and 6. The "coordinates of left localization position" stores the coordinates of the left localization position in one of the combinations of the right localization positions and the left localization positions as illustrated in FIGS. 5 and 6. The "parameters" store parameters calculated based on the transfer characteristics corresponding to the combination of the right localization position and the left localization position.

For example, in a record of "number"="1" stores "parameters"="$(A_1, B_1, C_1, D_1)$" in association with a combination of "coordinates of right localization position"="$(X_{R1}, Y_{R1}, Z_{R1})$" and "coordinates of left localization position"="$(X_{L1}, Y_{L1}, Z_{L1})$".

As such, in the example in FIG. 7, it is assumed that parameters are stored in association with every combination of a right localization position and a left localization position in the coordinate space constituted with the X-axis, Y-axis, and Z-axis illustrated in FIG. 5 and FIG. 6. However, the number of combinations to be included in the parameter information 700 may be reduced to a predetermined number, to store parameters for particular combinations.

(3) Details of the Operation Receiving Unit and the Adjustment Unit

Next, details of the operation receiving unit 101 and the adjustment unit 102 of the audio signal processing device 100 will be described.

Figure 8:
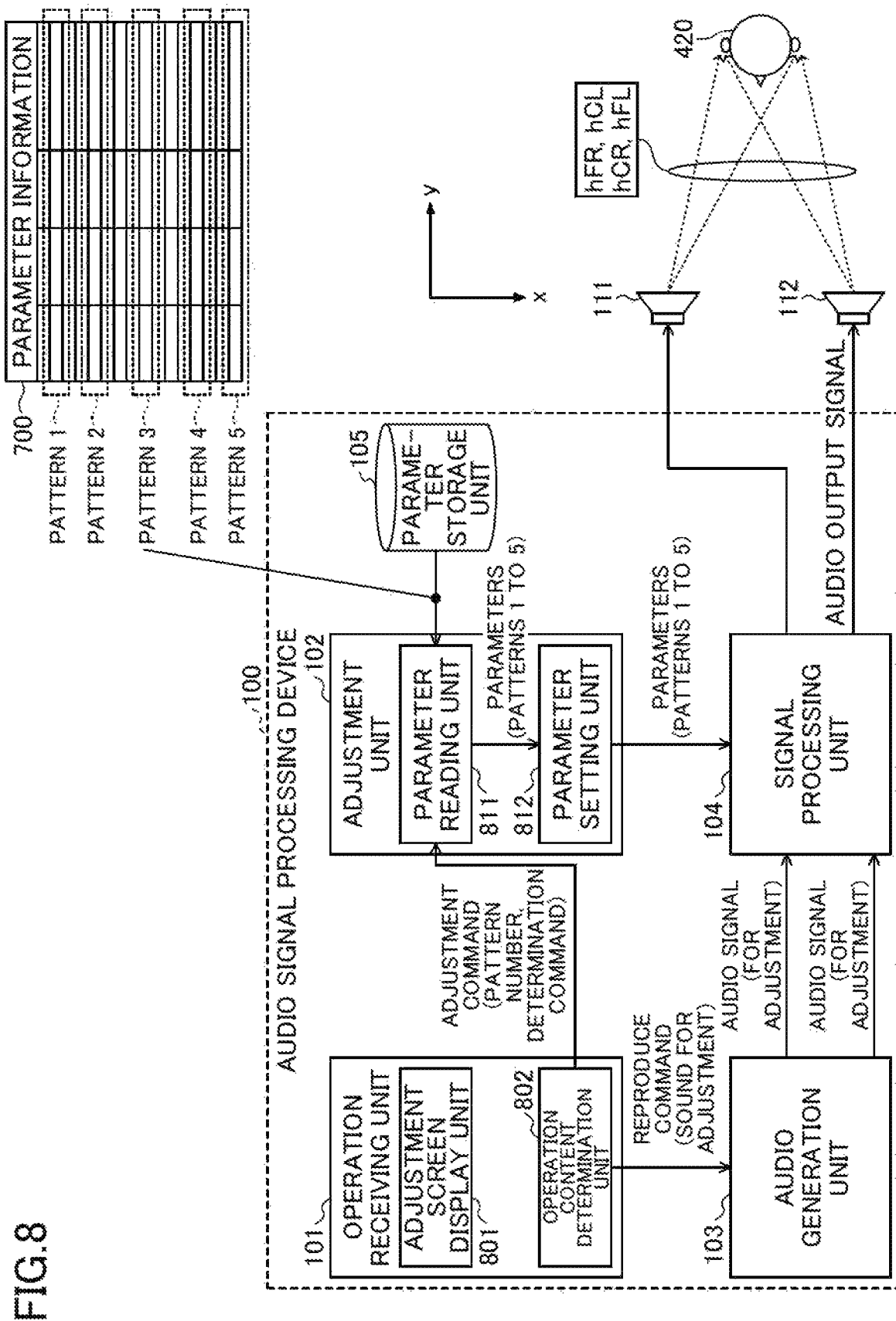
FIG. 8 is a diagram illustrating an example of a functional configuration of an operation receiving unit and an adjustment unit of the audio signal processing device according to the first embodiment.

(i) Functional Configuration of the Operation Receiving Unit and the Adjustment Unit First, a functional configuration of the operation receiving unit 101 and the adjustment unit 102 of the audio signal processing device 100 will be described. FIG. 8 is a diagram illustrating an example of a functional configuration of the operation receiving unit 101 and the adjustment unit 102 of the audio signal processing device 100 according to the first embodiment.

As illustrated in FIG. 8, the operation receiving unit 101 further includes an adjustment screen display unit 801 and an operation content determination unit 802. Also, the adjustment unit 102 further includes a parameter reading unit 811 and a parameter setting unit 812.

The adjustment screen display unit 801 displays a display screen on the display device 306 for receiving a reproduce command of a sound (sound for adjustment) output when determining the parameters, a determination command for determining the parameters, and the like.

The operation content determination unit 802 receives various commands input by the listener 420 who responds to the display screen displayed by the adjustment screen display unit 801.

Also, in the case where the received command is a reproduce command of the sound (sound for adjustment) output when determining the parameters, the operation content determination unit 802 notifies the audio generation unit 103 of the reproduce command. This causes the audio generation unit 103 to generate the sound for adjustment, and to transmit the audio signal to the signal processing unit 104.

Also, in the case where the received command is an automatic switching command of a predetermined number of parameters defined in advance, the operation content determination unit 802 notifies the adjustment unit 102 of the pattern number that specifies the parameters at predetermined time intervals. Further, in the case where the received command is a determination command to determine the parameters to be set in the signal processing unit 104, the operation content determination unit 802 notifies the adjustment unit 102 of the determination command.

When receiving a pattern number from the operation content determination unit 802, the parameter reading unit 811 reads the parameters corresponding to the pattern number from the parameter information 700 of the parameter storage unit 105, and notifies the parameter setting unit 812 of the parameters. Note that in the present embodiment, it is assumed that "pattern 1" to "pattern 5" are given as the pattern numbers for five combinations among combinations of right localization positions and left localization positions stored in the parameter information 700 (see the upper right corner of FIG. 8).

Therefore, the parameter reading unit 811 can notify the parameter setting unit 812 of the parameters corresponding to "pattern 1" to "pattern 5" at predetermined time intervals.

Further, when receiving a determination command from the operation content determination unit 802, the parameter reading unit 811 identifies parameters currently being read, and determines the parameters as parameters to be set in the signal processing unit 104.

The parameter setting unit 812 sets the parameters of "pattern 1" to "pattern 5" that are notified at the predetermined time intervals from the parameter reading unit 811, in the signal processing unit 104 at the predetermined time intervals.

Also, when the parameters to be set in the signal processing unit 104 are determined in the parameter reading unit 811, the parameter setting unit 812 sets the determined parameters in the signal processing unit 104.

(ii) Specific Examples of Display Screens

Figure 9A:
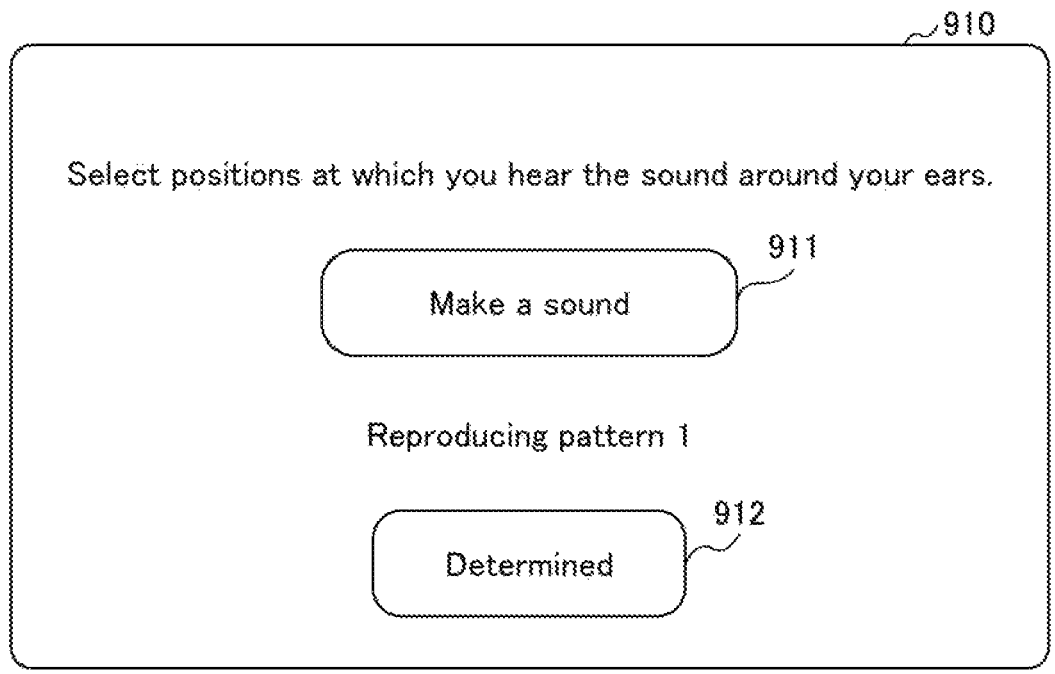
FIGS. 9A and 9B are first diagrams illustrating examples of display screens displayed by an adjustment screen display unit.
Figure 9B:
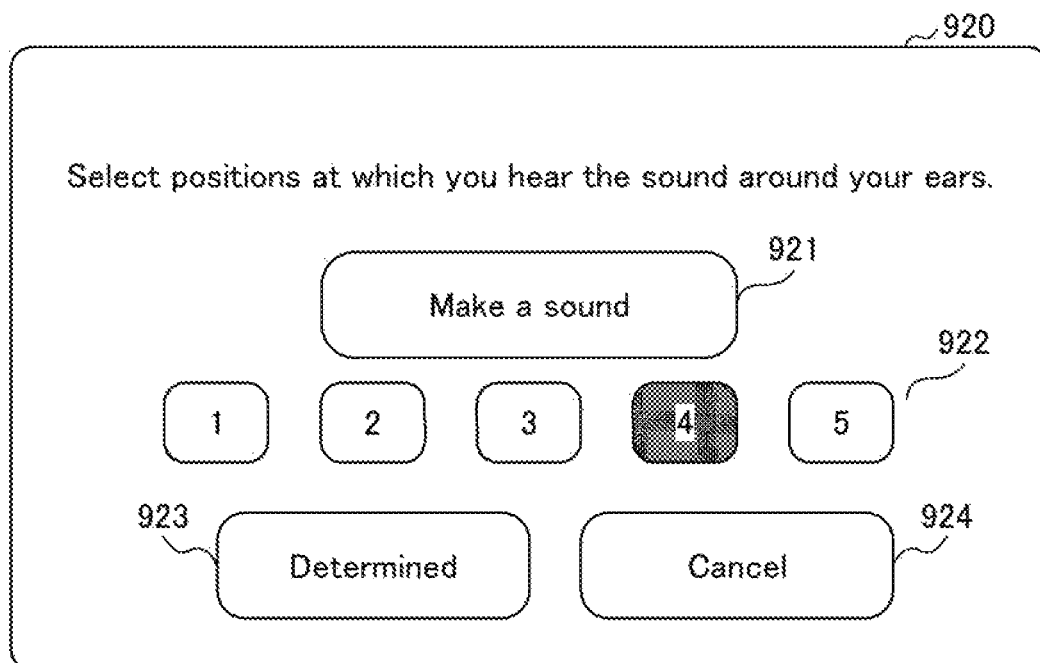

Next, specific examples of display screens displayed by the adjustment screen display unit 801 will be described. FIGS. 9A and 9B are first diagrams illustrating examples of display screens displayed by the adjustment screen display unit 801. As illustrated in FIG. 9A, a display screen 910 displayed by the adjustment screen display unit 801 includes a "Make a sound" button 911 and a "Determined" button 912.

In response to pressing on the "Make a sound" button 911 performed by the listener 420, the operation content determination unit 802 receives a reproduce command of the sound for adjustment and an automatic parameter switching command of a predetermined number of parameters defined in advance.

These commands cause the audio output devices 111 and 112 to output the sound for adjustment to which signal processing has been applied with parameters automatically switched at the predetermined time intervals. Note that the predetermined time interval may be any time interval between, for example, 0.5 seconds and 10 seconds.

The example in FIG. 9A illustrates that the sound for adjustment to which signal processing has been applied with the parameters of "pattern number"="pattern 1" is being output (reproduced).

The "Determined" button 912 is pressed by the listener 420, for example, when he/she feels the current localization positions are optimal. In response to pressing on the "Determined" button 912, the operation content determination unit 802 receives a determination command. This causes the parameter reading unit 811 to determine parameters currently being read as the parameters to be set in the signal processing unit 104.

Note that in the case where the "Determined" button 912 is not pressed, the operation content determination unit 802 notifies the adjustment unit 102 of the parameter number of the parameters set in the signal processing unit 104 before receiving the reproduce command of the sound for adjustment. This resets the parameters set in the signal processing unit 104, to the original parameters before receiving the reproduce command.

FIG. 9B illustrates a display screen in the case where the listener manually switches the parameters. As illustrated in FIG. 9B, a display screen 920 includes, in addition to a "Make a sound" button 921 and a "Determined" button 923, "pattern number" buttons 922 and a "Cancel" button 924.

In response to pressing on the "Make a sound" button 921 performed by the listener 420, the operation content determination unit 802 receives a reproduce command of the sound for adjustment. This causes the audio output devices 111 and 112 to output the sound for adjustment to which signal processing has been applied with default parameters.

Then, in response to pressing on one of the "pattern number" buttons 922, the operation content determination unit 802 receives a command to switch parameters to those corresponding to the selected pattern number.

This causes the audio output devices 111 and 112 to output the sound for adjustment to which signal processing has been applied with parameters corresponding to the selected pattern number.

The example in FIG. 9B illustrates that the sound for adjustment to which signal processing has been applied with the parameters of "pattern number"="pattern 4" is being output (reproduced).

The "Determined" button 923 is pressed by the listener 420, for example, when he/she feels the current localization positions are optimal. In response to pressing on the "Determined" button 923, the operation content determination unit 802 receives a determination command. This causes the parameter reading unit 811 to determine parameters currently being read as the parameters to be set in the signal processing unit 104.

The "Cancel" button 924 is pressed by the listener 420, for example, in the case where he/she has not determined optimal localization positions. In response to pressing on the "Cancel" button 924, the operation content determination unit 802 notifies the adjustment unit 102 of the pattern number of the parameters set in the signal processing unit 104 before receiving the reproduce command of the sound for adjustment. This resets the parameters set in the signal processing unit 104, to the original parameters before receiving the reproduce command.

(iii) Flow of Adjustment Processing

Figure 10:
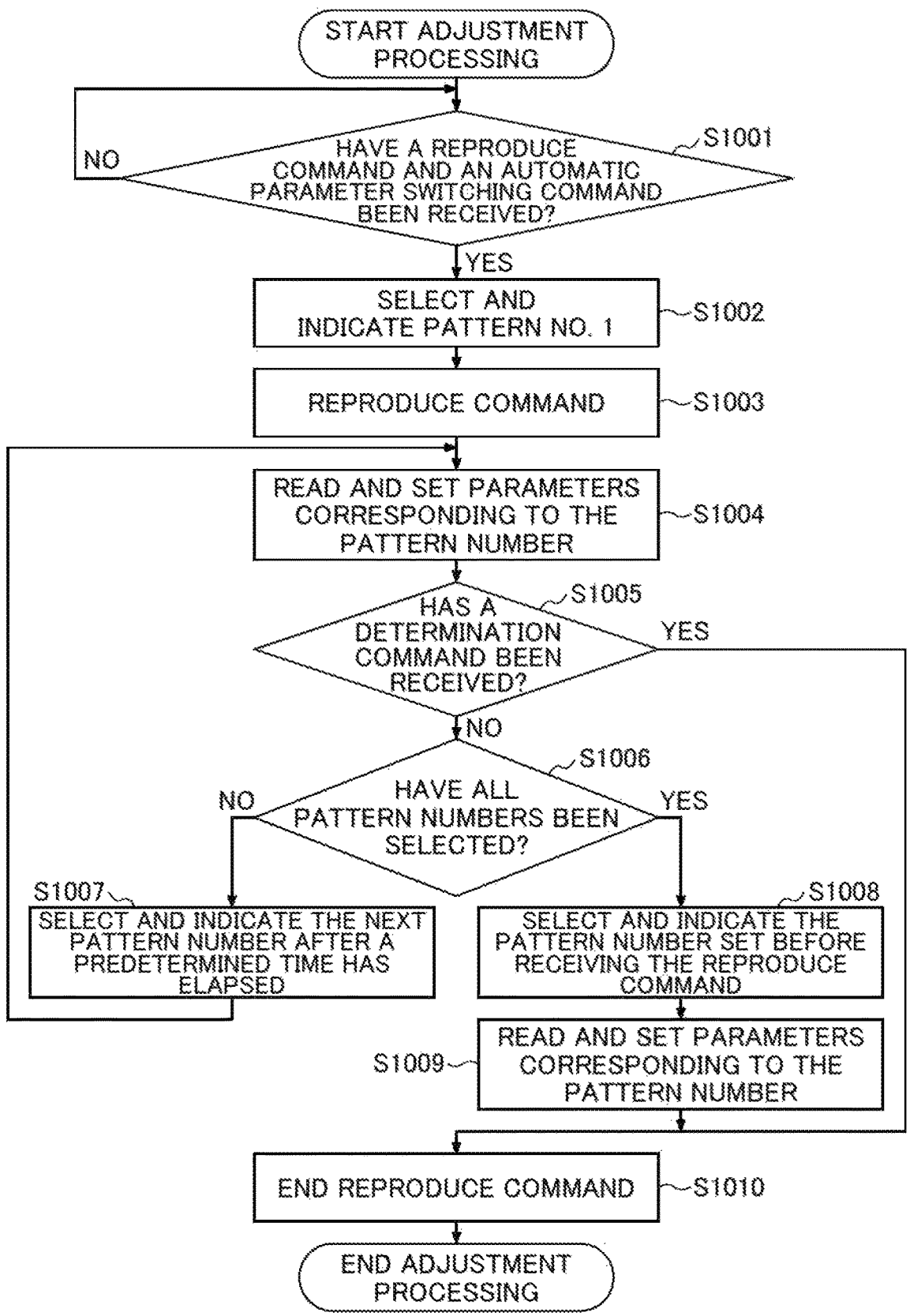
FIG. 10 is a first flow chart illustrating a flow of adjustment processing on the audio signal processing device.

Next, a flow of adjustment processing in the audio signal processing device 100 will be described. FIG. 10 is a first flow chart illustrating a flow of the adjustment processing in the audio signal processing device 100, which is a flow chart executed in the case where the adjustment screen display unit 801 displays the display screen 910 illustrated in FIG. 9A.

When the operation receiving program is activated and the adjustment screen display unit 801 displays the display screen 910 on the display device 306, the adjustment processing illustrated in FIG. 10 is started.

At Step S1001, the operation content determination unit 802 determines whether or not a reproduce command and an automatic parameter switching command are received. If it is determined that the "Make a sound" button 911 is not pressed and a reproduce command and an automatic parameter switching command are not received (in the case of NO at Step S1001), the operation content determination unit 802 waits until it determines that the commands are received.

On the other hand, if it is determined at Step S1001 that the "Make a sound" button 911 is pressed and the reproduce command and automatic parameter switching command are received (in the case of YES at Step S1001), the operation content determination unit 802 proceeds to Step S1002.

At Step S1002, the operation content determination unit 802 selects one of the pattern numbers (e.g., "pattern 1") and notifies the adjustment unit 102 of the selected pattern number. At Step S1003, the operation content determination unit 802 notifies the audio generation unit 103 of the reproduce command of the sound for adjustment.

At Step S1004, the parameter reading unit 811 reads the parameters corresponding to the pattern number notified by the operation content determination unit 802, from the parameter storage unit 105. Also, the parameter setting unit 812 sets the read parameters in the signal processing unit 104.

At Step S1005, the operation content determination unit 802 determines whether or not a determination command is received. If it is determined that the "Determined" button 912 is pressed and the determination command is received (in the case of YES at Step S1005), the operation content determination unit 802 proceeds to Step S1010. This causes, thereafter, the signal processing unit 104 to use the parameters set in the signal processing unit 104 when the "Determined" button 912 was pressed, for signal processing.

On the other hand, if it is determined at Step S1005 that the "Determined" button 912 is not pressed and the determination command is not received (in the case of NO at Step S1005), the operation content determination unit 802 proceeds to Step S1006.

At Step S1006, the operation content determination unit 802 determines whether or not all predetermined pattern numbers have been selected. At Step S1006, if it is determined that there is a pattern number that has not been selected (in the case of NO at Step S1006), the operation content determination unit 802 proceeds to Step S1007.

At Step S1007, after a predetermined time has elapsed, the operation content determination unit 802 selects the next pattern number, notifies the adjustment unit 102 of the selected number, and returns to Step S1004.

On the other hand, if it is determined at Step S1006 that all predetermined pattern numbers have been selected (in the case of YES at Step S1006), the operation content determination unit 802 proceeds to Step S1008. Note that at Step S1006, even if all pattern numbers have been selected, the pattern numbers may be repeatedly selected.

At Step S1008, the operation content determination unit 802 selects the pattern number of the parameters set in the signal processing unit 104 before receiving the reproduce command, and notifies of the selected number to the adjustment unit 102.

At Step S1009, the parameter reading unit 811 reads the parameters corresponding to the pattern number notified by the operation content determination unit 802, from the parameter storage unit 105. Also, the parameter setting unit 812 sets the read parameters in the signal processing unit 104.

At Step S1010, the operation content determination unit 802 notifies the audio generation unit 103 of a stop command to stop the reproduction of the sound for adjustment.

Figure 11:
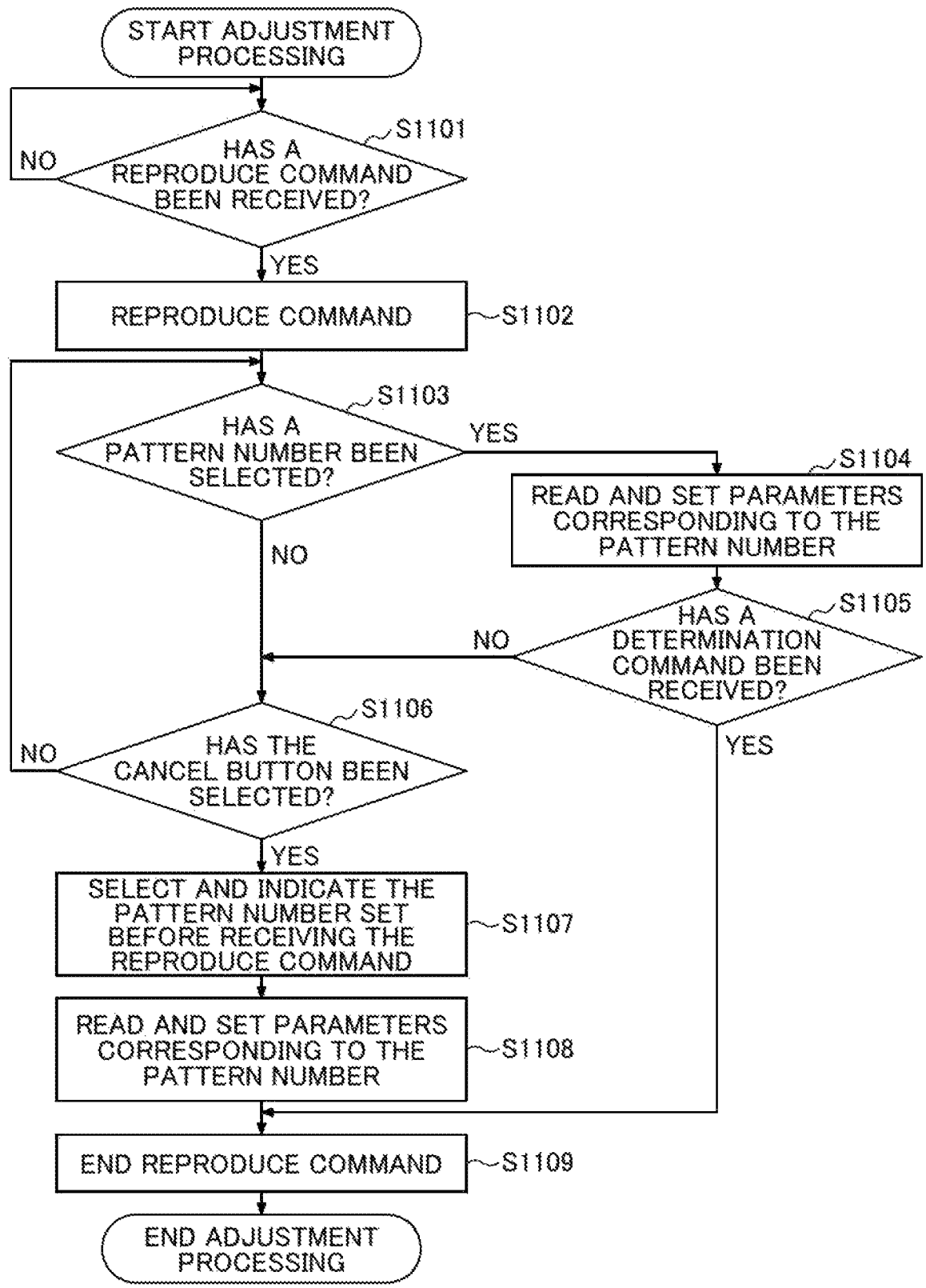
FIG. 11 is a second flow chart illustrating a flow of adjustment processing on the audio signal processing device.

Next, another flow of adjustment processing in the audio signal processing device 100 will be described. FIG. 11 is a second flow chart illustrating a flow of the adjustment processing in the audio signal processing device 100, which is a flow chart executed in the case where the adjustment screen display unit 801 displays the display screen 920 illustrated in FIG. 9B.

When the operation receiving program is activated and the adjustment screen display unit 801 displays the display screen 920 on the display device 306, the adjustment processing illustrated in FIG. 11 is started.

At Step S1101, the operation content determination unit 802 determines whether or not a reproduce command and an automatic parameter switching command are received. If it is determined that the "Make a sound" button 921 is not pressed and a reproduce command and an automatic parameter switching command are not received (in the case of NO at Step S1101), the operation content determination unit 802 waits until it determines that the commands are received.

On the other hand, if it is determined at Step S1101 that the "Make a sound" button 921 is pressed and the reproduce command and automatic parameter switching command are received (in the case of YES at Step S1101), the operation content determination unit 802 proceeds to Step S1102.

At Step S1102, the operation content determination unit 802 notifies the audio generation unit 103 of the reproduce command of the sound for adjustment. Also, the operation content determination unit 802 notifies the adjustment unit 102 of the default pattern number.

At Step S1103, the operation content determination unit 802 determines whether or not any of the pattern numbers is selected.

If it is determined at Step S1103 that any of the pattern numbers is selected (in the case of YES at Step S1103), the operation content determination unit 802 proceeds to Step S1104. At Step S1104, the operation content determination unit 802 notifies the adjustment unit 102 of the selected pattern number. Also, the parameter reading unit 811 reads the parameters corresponding to the pattern number notified by the operation content determination unit 802, from the parameter storage unit 105. Further, the parameter setting unit 812 sets the read parameters in the signal processing unit 104.

At Step S1105, the operation content determination unit 802 determines whether or not a determination command is received. If it is determined that the "Determined" button 923 is pressed and the determination command is received (in the case of YES at Step S1105), the operation content determination unit 802 proceeds to Step S1109. This causes, thereafter, the signal processing unit 104 to use the parameters set in the signal processing unit 104 when the "Determined" button 912 was pressed, for signal processing.

On the other hand, if it is determined at Step S1105 that the "Determined" button 923 is not pressed and the determination command is not received (in the case of NO at Step S1105), the operation content determination unit 802 proceeds to Step S1106.

On the other hand, if it is determined at Step S1103 that none of the "pattern number" buttons 922 is pressed by the listener 420 (in the case of NO at Step S1103), the operation content determination unit 802 proceeds to Step S1106.

At Step S1106, the operation content determination unit 802 determines whether or not the "Cancel" button 924 is pressed. If it is determined at Step S1106 that the "Cancel" button 924 is not pressed (in the case of NO at Step S1106), the operation content determination unit 802 returns to Step S1103. On the other hand, if it is determined at Step S1106 that the "Cancel" button 924 is pressed (in the case of YES at Step S1106), the operation content determination unit 802 proceeds to Step S1107.

At Step S1107, the operation content determination unit 802 selects the pattern number of the parameters set in the signal processing unit 104 before receiving the reproduce command, and notifies the adjustment unit 102 of the selected number.

At Step S1108, the parameter reading unit 811 reads the parameters corresponding to the pattern number notified by the operation content determination unit 802, from the parameter storage unit 105. Also, the parameter setting unit 812 sets the read parameters in the signal processing unit 104.

At Step S1109, the operation content determination unit 802 notifies the audio generation unit 103 of a stop command to stop the reproduction of the sound for adjustment.

<Summary>

As can be seen from the above description, the audio signal processing device 100 according to the first embodiment,

- stores parameters calculated for combinations of right localization positions and left localization positions relative to the positions of the audio output devices, at which a sound is localized, in the parameter storage unit;
- while automatically or manually switching the parameters for the combinations of right localization positions and left localization positions, processes the sound for adjustment and outputs processed audio signals;
- receives a determination command to determine one set of parameters from among the parameters for the combinations of right localization positions and the left localization positions; and
- by using the one set of parameters determined based on the received determination command, applies signal processing to the sound to be output from the audio output devices.

As such, according to the audio signal processing device 100 according to the first embodiment, it is possible to make the localization positions of a sound output from audio output devices adjustable by the listener.

Second Embodiment

In the first embodiment described above, the description assumes that the listener determines one set of parameters to be set in the signal processing unit from among a predetermined number of parameters defined in advance. In other words, in the first embodiment described above, the listener determines the one set of parameters from among a limited number of combinations of right localization positions and left localization positions. In contrast, in the second embodiment, the number of combinations is increased by allowing the listener to manipulate movement of the localization positions so that the listener can determine one set of parameters from among a greater number of combinations. In the following, the second embodiment will be described focusing on differences from the first embodiment described above.

<Details of Operation Receiving Unit and Adjustment Unit>

Figure 12:
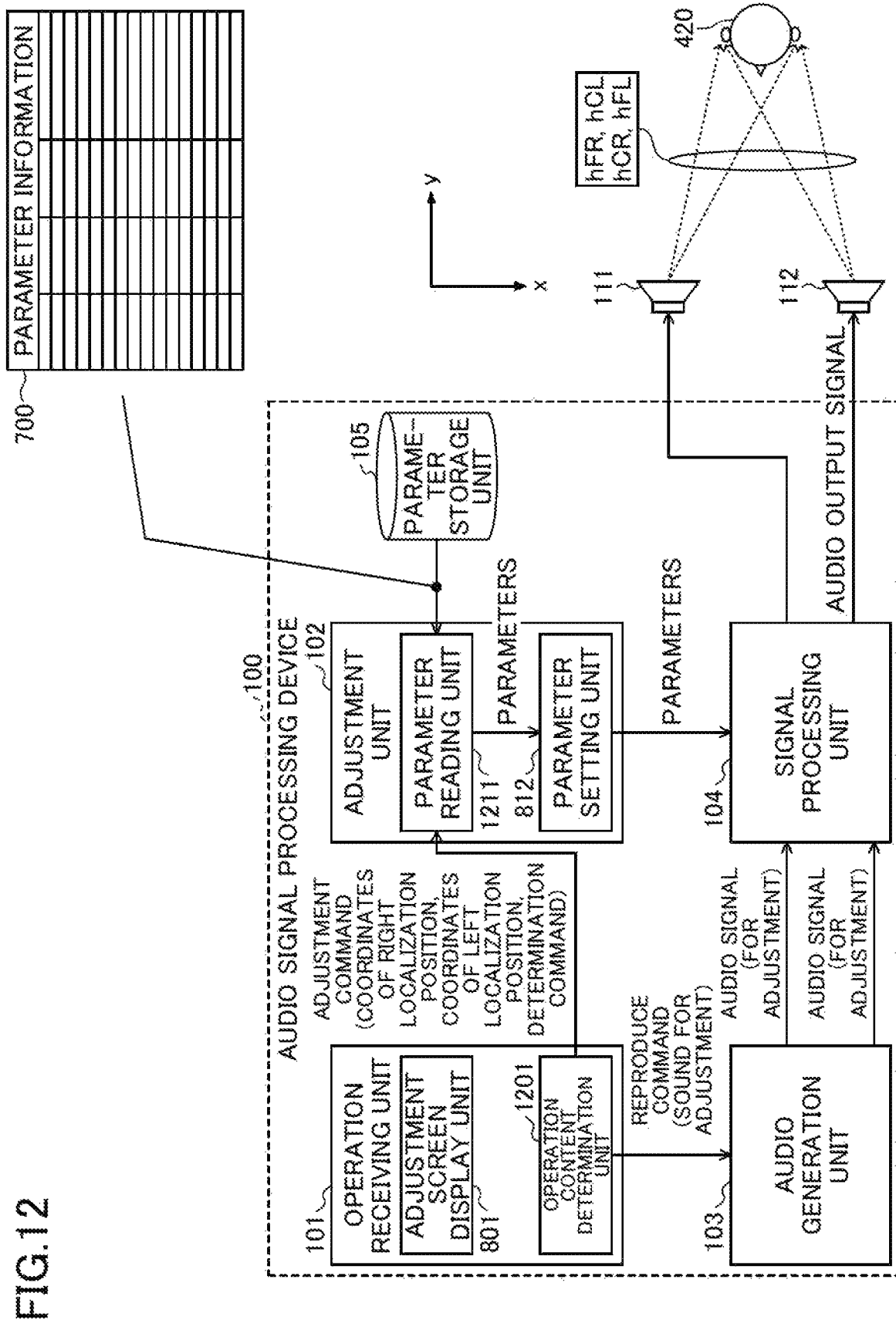
FIG. 12 is a diagram illustrating an example of a functional configuration of an operation receiving unit and an adjustment unit of the audio signal processing device according to a second embodiment.

(1) Functional Configuration of the Operation Receiving Unit and the Adjustment Unit First, a functional configuration of an operation receiving unit 101 and an adjustment unit 102 of an audio signal processing device 100 will be described according to the second embodiment. FIG. 12 is a diagram illustrating an example of a functional configuration of the operation receiving unit 101 and the adjustment unit 102 of the audio signal processing device 100 according to the second embodiment. Differences from FIG. 8 are an operation content determination unit 1201 and a parameter reading unit 1211.

The operation content determination unit 1201 receives various commands input by the listener 420 who responds to the display screen displayed by the adjustment screen display unit 801.

Also, in the case where the received command is a reproduce command of the sound (sound for adjustment) output when determining the parameters, the operation content determination unit 1201 notifies the audio generation unit 103 of the reproduce command.

Also, in the case where the received command is a move command to move the right localization position or the left localization position, or a width change command to change the width between the right localization position and the left localization position, the operation content determination unit 1201 determines the coordinates of the right localization position and the coordinates of the left localization position after the move or after the width change. Also, the operation content determination unit 1201 notifies the adjustment unit 102 of the determined coordinates of the right localization position and coordinates of the left localization position. Further, in the case where the received command is a determination command to determine the parameters to be set in the signal processing unit 104, the operation content determination unit 1201 notifies the adjustment unit 102 of the determination command.

When receiving the coordinates of the right localization position and the coordinates of the left localization position from the operation content determination unit 1201, the parameter reading unit 1211 reads parameters corresponding to the combination of the coordinates of the right localization position and the coordinates of the left localization position from the parameter information 700 of the parameter storage unit 105. Also, the parameter reading unit 1211 notifies the parameter setting unit 812 of the read parameters.

(2) Specific Examples of Display Screens

Next, specific examples of display screens displayed by the adjustment screen display unit 801 will be described. FIGS. 13A and 13B are second diagrams illustrating examples of display screens displayed by the adjustment screen display unit 801. As illustrated in FIG. 13A, a display screen 1310 displayed by the adjustment screen display unit 801 includes a "Make a sound" button 1311, "move command" buttons 1312, "width change" buttons 1313, a "Determined" button 1314, and a "Cancel" button 1315.

In response to pressing on the "Make a sound" button 1311 performed by the listener 420, the operation content determination unit 1201 receives a reproduce command of the sound for adjustment. This causes the audio output devices 111 and 112 to output the sound for adjustment to which signal processing has been applied with default parameters.

Then, in response to pressing on one of the "move command" buttons 1312, the operation content determination unit 1201 receives the selected number, and calculates the coordinates of the localization positions after the localization positions (both the right localization position and the left localization position) are moved in the direction and position corresponding to the selected number. Note that in the example in FIG. 13A, selected "move command" buttons 1312 are "4" in the vertical direction, "4" in the horizontal direction, and "4" in the front-to-back direction. At this time, the color, hatching, shape, and the like of the selected buttons may be differentiated from those of the other buttons. Also, in the case of displaying the display screen 1310 on a touch panel, the selected buttons may have a different pattern of vibration executed when touched, from that of the other buttons. Also, in the other embodiments, display appearances such as the color and the like of a selected button may be differentiated similarly.

This causes the audio output devices 111 and 112 to output the sound for adjustment to which signal processing has been applied with parameters corresponding to the localization positions after the movement.

Also, in response to pressing on one of the "width change" buttons 1313, the operation content determination unit 1201 receives the selected number and moves the right localization position and the left localization position to have the width corresponding to the received number, so as to change the width between the localization positions and to calculate the coordinates of the changed localization positions. Note that in the example in FIG. 13A, "5" is selected from among the "width change" buttons 1313. At this time, the color, hatching, shape, and the like of the selected buttons may be differentiated from those of the other buttons. Also, in the case of displaying the display screen 1310 on a touch panel, the selected buttons may have a different pattern of vibration executed when touched, from that of the other buttons. Also, in the other embodiments, display appearances such as the color and the like of a selected button may be differentiated similarly.

This causes the audio output devices 111 and 112 to output the sound for adjustment to which signal processing has been applied with parameters corresponding to the localization positions after the change.

The "Determined" button 1314 is pressed by the listener 420, for example, when he/she feels the current localization positions are optimal. In response to pressing on the "Determined" button 1314, the operation content determination unit 1201 receives a determination command. This causes the parameter reading unit 1211 to determine parameters currently being read as the parameter to be set thereafter in the signal processing unit 104.

The "Cancel" button 1315 is pressed by the listener 420, for example, in the case where he/she has not determined optimal localization positions. In response to pressing on the "Cancel" button 1315, the operation content determination unit 1201 notifies the adjustment unit 102 of the pattern number of the parameters set in the signal processing unit 104 before receiving the reproduce command of the sound for adjustment. This resets the parameters set in the signal processing unit 104, to the original parameters before receiving the reproduce command.

The example in FIG. 13B illustrates a display screen through which movement of the right localization position and movement of the left localization position can be performed separately. A difference from FIG. 13A is that there are "target selection" buttons 1321.

In the case of FIG. 13A, in response to pressing on one of the "move command" buttons 1312, both the right localization position and left localization position move; whereas in the case of FIG. 13B, one of or both of the localization positions specified with one of the "target selection" buttons 1321 move. This allows the listener 420 to move the right localization position and the left localization position separately.

(3) Flow of Adjustment Processing

Figure 14:
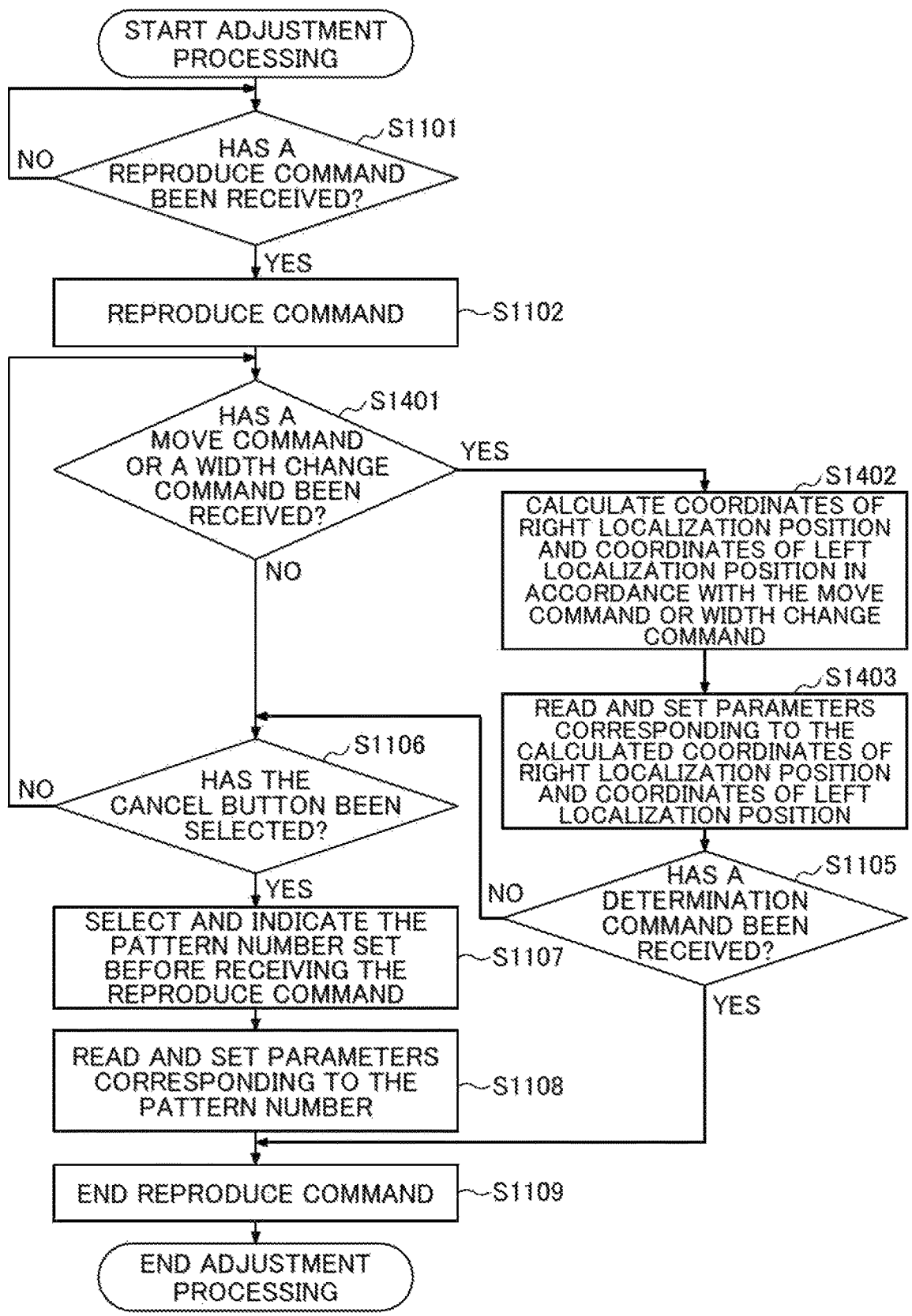
FIG. 14 is a third flow chart illustrating a flow of adjustment processing on the audio signal processing device.

Next, a flow of adjustment processing in the audio signal processing device 100 according to the second embodiment will be described. FIG. 14 is a third flow chart illustrating a flow of adjustment processing on the audio signal processing device. Differences from the flow chart illustrated in FIG. 11 are Steps S1401 to 1403.

At Step S1401, the operation content determination unit 1201 determines whether or not a move command or a width change command is received. If it is determined at Step S1403 that the move command or the width change command is received (in the case of YES at Step S1401), the operation content determination unit 1201 proceeds to S1402.

At Step S1402, the operation content determination unit 1201 calculates new coordinates of the right localization position and new coordinates of the left localization position after the movement or after the width change according to the move command or the width change command.

At Step S1403, the operation content determination unit 1201 notifies the adjustment unit 102 of the calculated coordinates of the right localization position and coordinates of the left localization position. Also, the parameter reading unit 1211 reads parameters corresponding to the combination of the coordinates of the right localization position and the coordinates of the left localization position notified by the operation content determination unit 1201, from the parameter storage unit 105. Further, the parameter setting unit 812 sets the read parameters in the signal processing unit 104.

<Summary>

As can be seen from the above description, the audio signal processing device 100 according to the second embodiment, displays a display screen through which the listener can move the localization positions or change the width between the localization positions; and by using the parameters according to the right localization position and left localization position after the movement or after the width change, processes the sound for adjustment and outputs processed audio signals.

As such, according to the audio signal processing device 100 of the second embodiment, it becomes possible for the listener to determine one set of parameters from among a greater number of combinations of right localization positions and left localization positions.

OTHER EMBODIMENTS

In the first and second embodiments described above, the description assumes that the parameter information 700 in the case of the distance between the audio output device 111 and the audio output device 112 being $L_0$ is stored in the parameter storage unit 105. However, parameter information on multiple patterns having different distances between the audio output device 111 and the audio output device 112 may be stored in the parameter storage unit 105. This allows the listener 420 to perform adjustment also for the distance between the audio output device 111 and the audio output device 112.

Also, in the first and second embodiments described above, although the description assumes that the functions of the audio signal processing device 100 are implemented on a navigation device, the device to implement the functions of the audio signal processing device 100 is not limited to a navigation device. For example, the functions may be implemented on any device having a display function, such as a portable device including a smartphone, a game machine, a personal computer, a TV, or the like.

Alternatively, the functions of the audio signal processing device 100 may be implemented on a device capable of connecting with a display device even though the device itself does not have a display function. For example, the functions of the audio signal processing device 100 may be implemented on a player that reproduces DVDs, Blu-ray Discs, and the like, or on a recorder, a set-top box, a smart speaker, a network sound player, and the like. Note that in these cases, the operation content determination unit may be configured to receive an operation from a remote control unit or the like accompanying the display device.

Further, the functions of the audio signal processing device 100 may be implemented on a device having some sort of operation buttons even though the device does not have a display function and is not connected to a display device. For example, the functions may be implemented on a sound component or the like.

Also, in the first and second embodiments described above, although the description assumes that the audio output devices 111 and 112 include a speaker function, the audio output devices 111 and 112 may further include a microphone function. This allows, for example, in the case of the audio signal processing device 100 being a smartphone, the listener 420 to make a call with the other party over the smartphone via the audio output devices 111 and 112.

Also, in the first and second embodiments described above, although the description assumes that the sound for adjustment is output based on a reproduce command, the sound to be output based on a reproduce command may be any sound.

Note that the present inventive concept is not limited to the configurations described herein, which include the configurations in the above embodiments and configuration in which other elements are combined. In these regards, it is possible to alter a configuration within a range not deviating from the gist of the present inventive concept, and the range can be appropriately determined according to the application form.

All examples and conditional language recited herein are intended for pedagogical purposes to aid the reader in understanding the inventive concept and the concepts contributed by the inventor to furthering the art, and are to be construed as being without limitation to such specifically recited examples and conditions, nor does the organization of such examples in the specification relate to a showing of the superiority and inferiority of the inventive concept. Although the embodiments of the present inventive concept have been described in detail, it should be understood that various changes, substitutions, and alterations could be made hereto without departing from the spirit and scope of the inventive concept.

What is claimed is:

1. An audio signal processing device comprising:
   a memory; and
   a processor configured to execute:
   receiving a command to select a pattern number from among a plurality of pattern numbers each associated with a set of parameters calculated according to positions at which a sound is localized, the positions being set relative to positions of audio output devices; and
   processing a sound to be output from the audio output devices, by using the one set of parameters determined based on the received command.

2. The audio signal processing device as claimed in claim 1, wherein the processor is configured to further execute:
   switching the parameters calculated according to the positions at predetermined time intervals; and
   by using the switched parameters, when the processing processes the sound output from the audio output devices, performing the receiving of the command to determine the one set of parameters.

3. The audio signal processing device as claimed in claim 1, wherein the receiving further receives a command to move the positions relative to the positions of the audio output devices, the command being one of:
   a command to move the positions in a depth direction with respect to the audio output devices,
   a command to move the positions in a vertical direction with respect to the audio output devices, and
   a command to move the positions in a horizontal direction with respect to the audio output devices, and
   wherein the receiving selects parameters calculated according to the positions obtained after executing the command to move, and
   receives the command to determine the one set of parameters when the processing processes the sound output from the audio output devices by using the selected parameters.

4. The audio signal processing device as claimed in claim 3, wherein the receiving further receives a command to change a width between two positions relative to the positions of the audio output devices, to select the parameters calculated according to the two positions after executing the command to change.

5. The audio signal processing device as claimed in claim 1, wherein the receiving displays a display screen for receiving the command to determine the one set of parameters.

6. An audio adjustment method executed by a computer including a memory and a processor, the method comprising:
   receiving a command to select a pattern number from among a plurality of pattern numbers each associated with a set of parameters calculated according to positions at which a sound is localized, the positions being set relative to positions of audio output devices; and
   processing a sound to be output from the audio output devices, by using the one set of parameters determined based on the received command.

7. A non-transitory computer-readable recording medium having computer-readable instructions stored thereon, which when executed, cause a computer including a memory and a processor to execute an audio adjustment method, the method comprising:

receiving a command to select a pattern number from among a plurality of pattern numbers each associated with a set of parameters calculated according to positions at which a sound is localized, the positions being set relative to positions of audio output devices; and processing a sound to be output from the audio output devices, by using the one set of parameters determined based on the received command.

* * * * *